June 27, 1967  J. H. KYLE  3,327,832
EXPANDABLE CELL CONVEYOR
Filed June 28, 1966
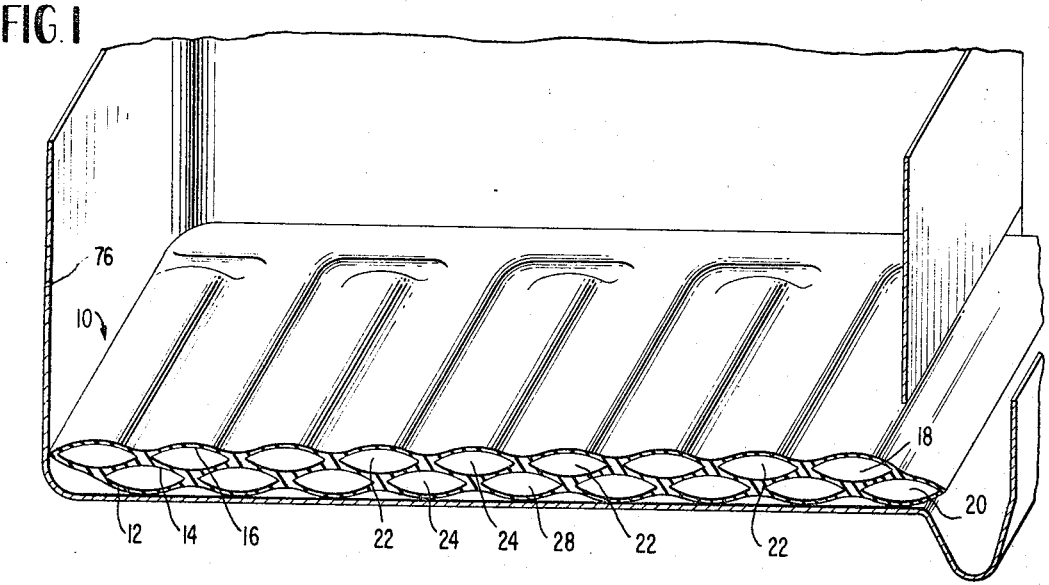
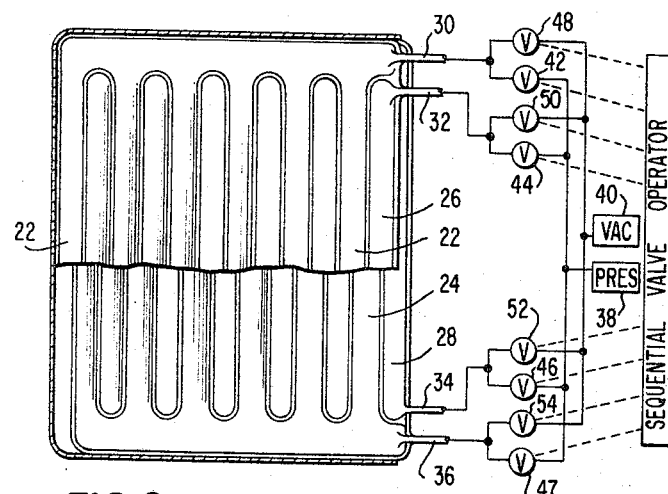
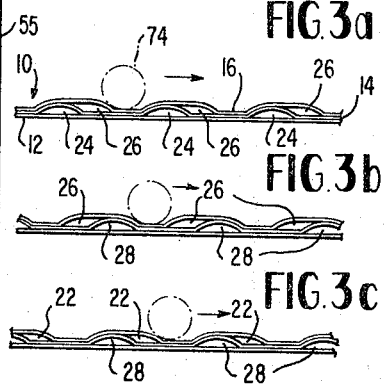
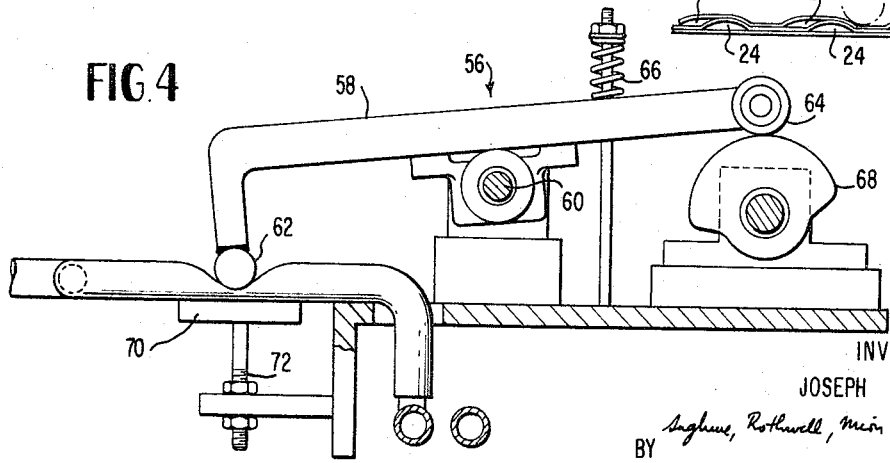
INVENTOR
JOSEPH H. KYLE
BY *Sughrue, Rothwell, Mion, Zinn & Macpeak*
ATTORNEYS

United States Patent Office 3,327,832
Patented June 27, 1967

3,327,832
EXPANDABLE CELL CONVEYOR
Joseph H. Kyle, Lancaster, Pa., assignor to Armstrong Cork Company, Lancaster, Pa., a corporation of Pennsylvania
Filed June 28, 1966, Ser. No. 561,130
7 Claims. (Cl. 198—1)

This invention relates to improvements in conveyors and particularly relates to an expandable cell conveyor in which a plurality of cells of a conveyor are selectively inflated and deflated to provide a moving undulating surface for conveying material.

In emptying bulk containers, at present it is common to utilize a tilting dumping device to dump the entire container or other equipment for unloading the material from the container. There is a need in the art for a simple unloading device for bulk goods such as grain and the like, and this invention fulfills such a need by utilizing a simple but unique inflatable cellular construction in which selective inflation of adjacent cells in multiple layers of cells will cause undulation of the conveyor and materials resting on the conveyor will be thereby moved. It is particularly applicable for flat bottom containers and eliminates the necessity for sloping sides. It also eliminates the necessity for tilting the container to discharge the bulk contents.

The foregoing and other features and advantages of the invention will be apparent from the following description of a preferred embodiment of the invention, as illustrated in the accompanying drawing.

In the drawing:

FIG. 1 is a perspective view in section of the conveyor of this invention in a bin to be unloaded with all cells inflated for clarity;

FIG. 2 is a plan view partially in section of the conveyor with fluid connections thereto shown schematically;

FIGS. 3a, 3b, 3c and 3d illustrate the sequential inflation of the cells of the conveyor to provide undulating movement; and FIG. 4 is a sectional view of one form of valve operator for controlling inflation and deflation of the conveyor cells.

Referring to the drawing, an expandable cell conveyor 10 may be suitably formed by seam bonding or fusing three or more sheets 12, 14 and 16 of resilient elastic material to form in effect an upper layer 18 of cells and a lower layer 20 of cells. There are a series of four cells 22, 24, 26 and 28 in the upper and lower layers and each cell of the upper layer overlaps at its midpoint the joining of the cells of the lower layers. There are fluid connections 30, 32, 34 and 36 for the individual cells 22, 24, 26 and 28, respectively. It can also be seen from FIGURES 1 and 2 that there are a plurality of identical cells 22 connected to the same fluid connection 30 and other individual cells 24, 26 and 28 have a similar construction. The cells are selectively inflated and deflated from a pressure source 38 and vacuum source 40. Pressure valves 42, 44, 46 and 47 and vacuum valves 48, 50, 52 adn 54 allow pressure and vacuum to be applied to selective ones of the individual cells 22, 24, 26 and 28 under control of sequential valve operator 55.

One means of selectively controlling the application of vacuum and pressure through the fluid flow connections shown in FIGURE 2 is a cam driven pinch valve operator for each of the valves 42, 44, 46, 47, 48, 50, 52 and 54. The cam pinch valve assembly 56 may include a rock lever 58 pivoted about the shaft 60 and having a valve pinch surface 62 at one end and a cam follower 64 at the other end. A spring 66 biases the cam follower 64 against a cam 68 which controls the operation of the valve. For adjusting the closing force, a pinch valve backing plate 70 is adjustably positioned by screw 72. The cams 68 for the various of the pressure valves 42, 44, 46 and 47 and the vacuum valves 48, 50, 52 and 54 are positioned such that the operation of the conveyor is in four stages as shown in FIGURES 3a, 3b, 3c and 3d.

The operation of the conveyor can be best seen with reference to the four stages of FIGS. 3a, 3b, 3c and 3d. In the first stage, FIG. 3a, individual cells 24 and 26 are inflated while 22 and 28 are deflated. In the second stage, FIG. 3b, the cells 26 and 28 are inflated while 22 and 24 are deflated. In the third stage FIG. 3c, cells 28 and 22 are inflated while 24 and 26 are deflated. In the fourth stage, FIG. 3d, cells 22 and 24 are inflated while 26 and 28 are deflated. In this manner, the surface of the expanding cell conveyor 10 undulates and any material 74 which is on the conveyor surface is moved in the direction of undulation as shown by the arrow in FIGURES 3a–3d. It can be seen that two adjacent cells, one in each layer are inflated, then an adjacent cell of one layer in the direction of movement is inflated while a previously inflated cell in the same layer opposite the direction of movement is deflated. This sequential inflation continues for four stages and then repeats itself.

The cells may be of any suitable size and width, and if the expandable cell conveyor does not itself completely fill the bottom of a bin or container 76 shown in FIGURE 1, it may be provided with suitable walls for containing material to be conveyed.

It can be seen from the foregoing that a simple and inexpensive expandable cell undulating conveyor assembly has been provided merely by bonding together three or more sheets of resilient elastic material to provide a series of expanding cells and providing a suitable source of pressure and vacuum and selective valving arrangements for operating the undulating sequence of inflation and deflation of the cells.

While the invention has been particularly shown and described with reference to a preferred embodiment thereof, it will be understood by those skilled in the art that various changes in form and details may be made herein without departing from the spirit and scope of the invention as defined in the following claims.

I claim:
1. An expandable cell conveyor comprising:
   (a) a plurality of inflatable expandable cells positioned in two layers so that each cell of a top layer partially overlaps two cells of a lower layer,
   (b) means for selectively inflating at least two adjacent cells, one of each layer, and selectively deflating at least two other cells, one of each layer, and
   (c) means for shifting the selective inflation means to serially inflate one cell of one layer adjacent the two cells first inflated while deflating the next adjacent and previously inflated cell of the same layer as the newly inflated cell.

2. An expandable cell conveyor as in claim 1 wherein the cells of each layer are substantially the same size and are formed of three seam bonded sheets of resilient elastic material so that they are hingedly connected together, and wherein the center of the cells of the top layer overlie the hinge connection of the cells of the lower layer.

3. An expandable cell conveyor as defined in claim 1 wherein the means for selectively inflating and deflating include a pressure source and a vacuum source, and selectively sequentially operated valves between said sources and the cells.

4. An expandable cell conveyor as defined in claim 3 wherein the means for shifting the selective inflation includes a sequencing operator for the valves.

5. An expandable cell conveyor as defined in claim 4 wherein the sequencing operator for the valves includes a cam shaft sequentially operating the valves serially by cams on the cam shaft.

6. An expandable cell conveyor as in claim 3 wherein there are two cells in each layer, and a number of the same cells are connected to the pressure and vacuum sources so that the selective inflation is shifted in four stages and then repeated to cause undulating movement of the surface of the conveyor.

7. An expandable cell conveyor as in claim 1 wherein means are provided to restrict dislocation of the conveyor relative to the container.

FOREIGN PATENTS

References Cited 1,032,637   11/1963   Great Britain.

EVON C. BLUNK, *Primary Examiner.*

A. C. HODGSON, *Assistant Examiner.*